(12) United States Patent
Lorenz et al.

(10) Patent No.: US 7,246,816 B2
(45) Date of Patent: Jul. 24, 2007

(54) GAS BAG MODULE FOR A MOTOR VEHICLE STEERING WHEEL

(75) Inventors: Christian Lorenz, Leidersbach (DE); Matthias Helmstetter, Aschaffenburg (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 418 days.

(21) Appl. No.: 10/799,567

(22) Filed: Mar. 11, 2004

(65) Prior Publication Data

US 2004/0183278 A1    Sep. 23, 2004

(30) Foreign Application Priority Data

Mar. 21, 2003  (DE) .......................... 203 04 551 U

(51) Int. Cl.
*B60R 21/203*   (2006.01)

(52) U.S. Cl. .................. 280/728.2; 280/731; 280/740; 280/742

(58) Field of Classification Search ............. 280/728.2, 280/731, 740, 742
See application file for complete search history.

(56) References Cited

U.S. PATENT DOCUMENTS

| | | | | |
|---|---|---|---|---|
| 5,700,029 A * | 12/1997 | Enders | ..................... | 280/728.2 |
| 5,730,459 A | 3/1998 | Kanda | | |
| 5,826,901 A * | 10/1998 | Adomeit | ................... | 280/728.2 |
| 6,082,765 A * | 7/2000 | Bowers et al. | ............... | 280/742 |
| 6,106,002 A * | 8/2000 | Haesaert et al. | ......... | 280/728.2 |
| 6,176,511 B1 * | 1/2001 | Adkisson et al. | ........ | 280/728.2 |
| 6,361,065 B1 | 3/2002 | Frisch | | |
| 6,398,255 B1 | 6/2002 | Scherzinger et al. | | |
| 6,435,540 B1 * | 8/2002 | Durre | ..................... | 280/728.2 |
| 6,439,599 B1 | 8/2002 | Laue et al. | | |
| 6,679,518 B2 * | 1/2004 | Varcus et al. | ............ | 280/728.2 |
| 6,758,489 B2 * | 7/2004 | Xu | ........................... | 280/728.1 |
| 6,783,149 B2 * | 8/2004 | Lovell et al. | ............. | 280/728.2 |
| 6,811,181 B2 * | 11/2004 | Hauer | ........................ | 280/731 |
| 6,814,369 B2 * | 11/2004 | Heindl | ..................... | 280/728.2 |
| 2002/0117836 A1 | 8/2002 | Asic et al. | | |
| 2002/0175500 A1 | 11/2002 | Heindl | | |

(Continued)

FOREIGN PATENT DOCUMENTS

DE      19840998      3/2000

(Continued)

*Primary Examiner*—Paul N. Dickson
*Assistant Examiner*—Laura B. Freedman
(74) *Attorney, Agent, or Firm*—Tarolli, Sundheim, Covell & Tummino LLP

(57) ABSTRACT

A gas bag module for a motor vehicle steering wheel includes a gas bag (10), a gas generator (12) mounted so as to be capable of swinging, a generator carrier (16), means (18) for bracing the gas bag (10) on the generator carrier (16), and an elastically deformable, in relation to the central axis (A) of the gas bag module encircling sealing element (24). The sealing element (24) is fastened by its free edges directly or indirectly to the gas generator (12) and to the generator carrier (16), respectively. A section (26) of the sealing element (24), which is free before a filling of the gas bag (10), is deflected by the pressure occurring in the interior of the gas bag on filling of the gas bag (10), so that it comes directly or indirectly in abutment with a support surface (22; 28).

12 Claims, 4 Drawing Sheets

U.S. PATENT DOCUMENTS

| | | |
|---|---|---|
| 2003/0038462 A1 | 2/2003 | Leibach et al. |
| 2003/0116948 A1* | 6/2003 | Back et al. ................. 280/731 |
| 2004/0012177 A1* | 1/2004 | Sauer ......................... 280/731 |

FOREIGN PATENT DOCUMENTS

| | | |
|---|---|---|
| DE | 10002480 | 8/2001 |
| DE | 10110912 | 9/2002 |
| EP | 1026050 | 8/2000 |
| EP | 1065110 | 1/2001 |
| EP | 1101662 A2 * | 5/2001 |
| EP | 1273488 | 1/2003 |
| WO | 00/15470 | 3/2000 |

* cited by examiner

GAS BAG MODULE FOR A MOTOR VEHICLE STEERING WHEEL

TECHNICAL FIELD

The invention relates to a gas bag module for a motor vehicle steering wheel.

BACKGROUND OF THE INVENTION

Among the various kinds of gas bag modules there is known a type of a gas bag module for a motor vehicle steering wheel, comprising a gas bag, a gas generator mounted so as to be capable of swinging, a generator carrier, means for bracing the gas bag on the generator carrier, and an elastically deformable, in relation to a central axis of the gas bag module encircling sealing element. Such gas bag modules in which, to increase comfort and driving safety, the gas generator is used as a vibration amortizer in order to damp the vehicle vibrations transferred to the steering wheel via the rigid steering column, are known for example from published European patent application EP-A-1 026 050. Therein, a gas bag module is proposed, in which a mounting cylinder of elastic material, aligned parallel to the steering wheel axis, is connected by its free edges on the one hand with a ring-shaped mounting plate and on the other hand with a mounting flange of the gas generator. An edge of the mounting cylinder can be used for sealing the gas bag interior against the environment, when it comes into abutment with an auxiliary flange. Thereby, impurities are prevented from penetrating into the gas bag and filling gases are prevented from leaving the gas bag in the case of activation.

In the published international application WO 00/15470 a gas bag module for a motor vehicle steering wheel is shown, in which an elastic element, which is fastened to a component securely connected with the gas bag module, has a sealing lip. After ignition of the gas generator, the sealing lip lies against a flange of the gas generator, in order to seal the gas bag interior.

It is an object of the invention to improve the sealing of the gas bag interior in the case of activation, in particular with regard to a better sealing effect and a higher stability of the seal.

BRIEF SUMMARY OF THE INVENTION

A gas bag module for a motor vehicle steering wheel according to the invention comprises a gas bag, a gas generator mounted so as to be capable of swinging, a generator carrier, means for bracing the gas bag on the generator carrier, and an elastically deformable, in relation to a central axis of the gas bag module encircling sealing element. The sealing element is fastened by its free edge portions directly or indirectly to the gas generator and to the generator carrier, respectively. A middle section of the sealing element, which is free before a filling of the gas bag, is deflected by the pressure occurring in the interior of the gas bag on filling of the gas bag, so that the middle section comes directly or indirectly in abutment with a support surface. Through the support surface, the sealing element, which is acted upon by pressure, is relieved and is secured against bursting. The sealing element can be accordingly constructed having thinner walls, whereby the swinging capability of the gas generator is improved.

According to a further aspect of the invention, a gas bag module for a motor vehicle steering wheel comprises a gas bag, a gas generator mounted so as to be capable of swinging, a generator carrier, and means for bracing the gas bag on the generator carrier. The gas generator is deflected by the pressure occurring in the interior of the gas bag on filling of the gas bag, so that the gas generator is pressed against a support surface formed on the generator carrier. A sealing element is provided between the gas generator and the support surface. Thus, the deflection, caused by the gas pressure, of the gas generator, which is mounted so as to be capable of swinging, is used for sealing the interior of the gas bag.

An embodiment proves to be particularly advantageous, in which several segments of an elastically deformable material are provided distributed over the periphery of the gas generator, which are fastened directly or indirectly to the gas generator and to the generator carrier and by which the gas generator is at least partially supported in the gas bag module. The mounting by means of individual segments, which permits more freedom of construction in the gas bag module design, is possible because it is not the segments, but rather the gas generator itself, pressed against the support surface, that provides the sealing of the interior of the gas bag.

Further advantageous developments of the preferred embodiments of the invention are indicated in the subclaims.

BRIEF DESCRIPTION OF THE DRAWINGS

FIG. 4a shows a half-section of a gas bag module according to the invention in accordance with a fourth embodiment in the non-activated state;

FIG. 4b shows an enlargement of the detail X of FIG. 4a; and

DETAILED DESCRIPTION OF THE PREFERRED EMBODIMENTS

Figure 1A:
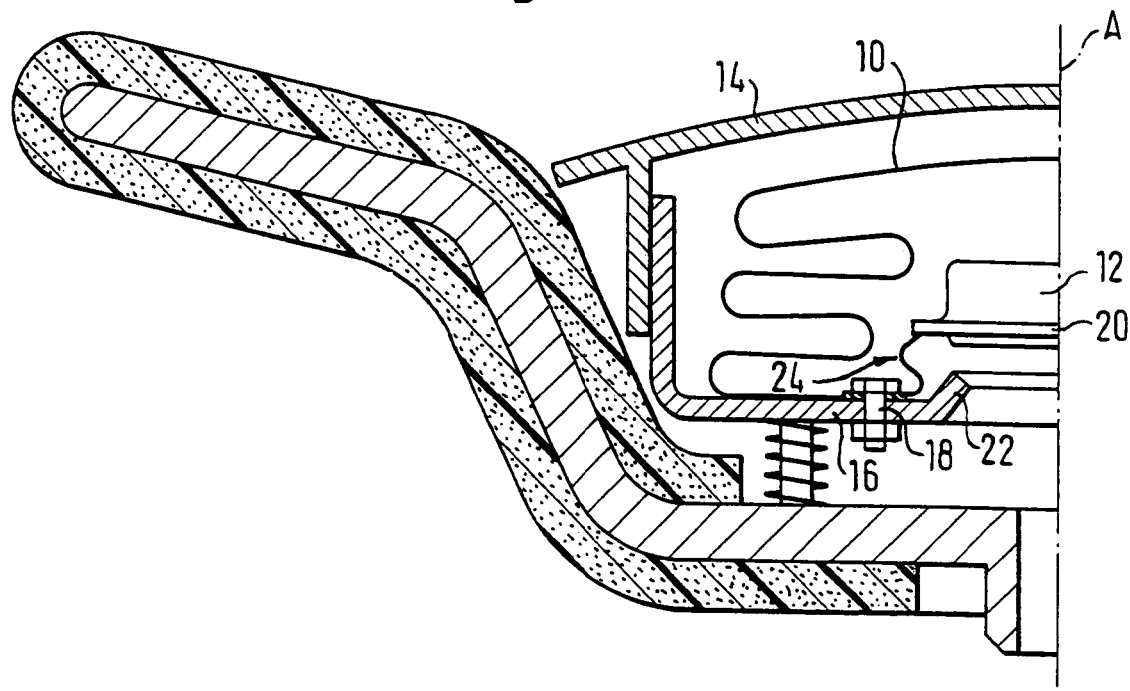
FIG. 1a shows a half-section of a gas bag module according to the invention in accordance with a first embodiment in the non-activated state.

The embodiment of the gas bag module according to the invention, illustrated in FIG. 1a, comprises a gas bag 10, a gas generator 12, a covering cap 14, a generator carrier 16 and a screw connection 18, by means of which the edge of the gas bag 10, surrounding the inlet opening, is braced with the generator carrier 16. The gas generator 12 is mounted so as to be capable of swinging relative to the remaining components of the gas bag module and can therefore be used to damp undesired vibrations.

The gas generator 12 has an encircling mounting flange 20 in relation to the central axis A of the gas bag module, opposite which flange 20 is an obliquely angled, encircling section 22 of the generator carrier 16. A cylinder-like sealing element 24 of an elastic material is firmly connected by its free edge portions on the one hand with the mounting flange 20 of the gas generator 12 and on the other hand with the generator carrier 16 via the screw connection 18. With the encircling sealing element 24a sealing of the gas bag interior is achieved, in particular between the angled section 22 of the generator carrier 16 and the mounting flange 20 of the gas generator 12. The sealing element 24 is "upset" (jolt) between its free edges in axial direction, so that it has a wave-like contour in cross-section. Thereby sufficient play remains for the gas generator 12, which is partially mounted by the sealing element 24, so that its function as vibration amortizer is not affected.

Figure 1B:
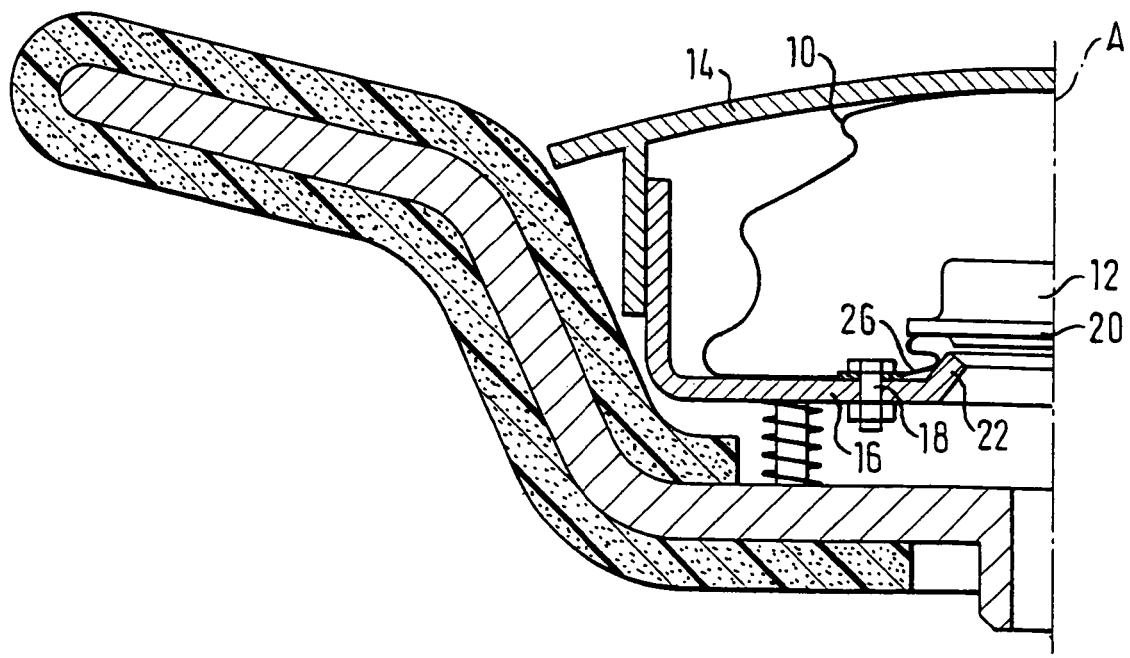
FIG. 1b shows a half-section of the gas bag module according to FIG. 1 in the activated state.

In the case of activation, which is illustrated in FIG. 1b, gas emerges from the gas generator 12, in order to fill the gas bag 10. Through the pressure occurring thereby in the interior of the gas bag, a middle section 26 of the sealing element 24 is pressed against the angled section 22 of the generator carrier 16. The angled section 22 takes up a majority of the pressure and thus relieves the sealing element 24.

Figure 2:
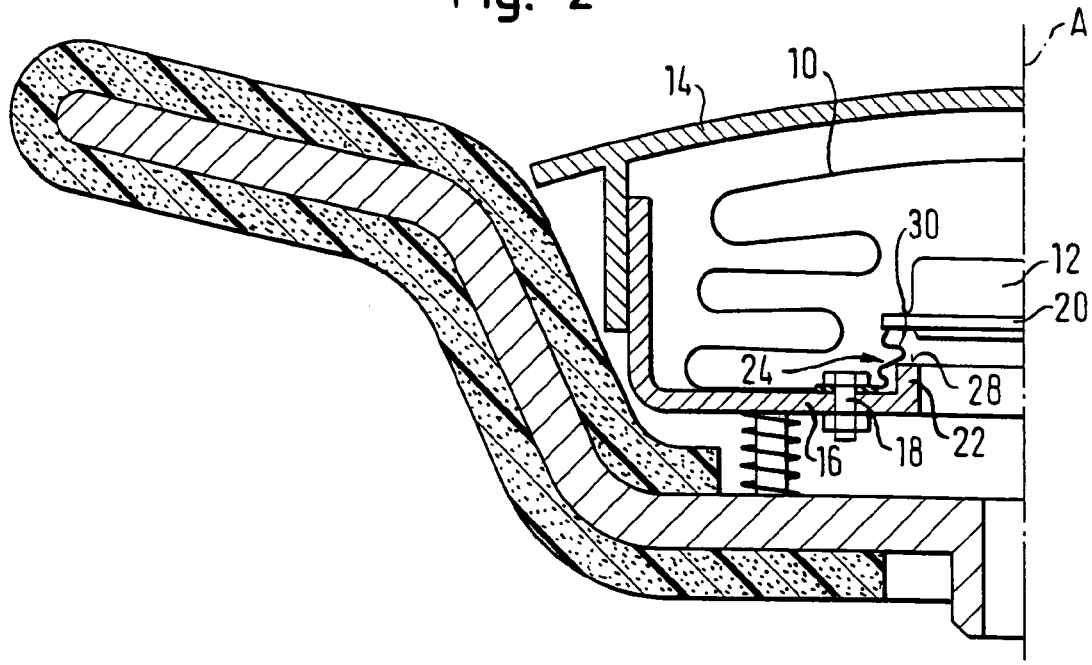
FIG. 2 shows a half-section of a gas bag module according to the invention in accordance with a second embodiment in the non-activated state.

In the embodiment shown in FIG. 2, the components which correspond to those of the embodiment of FIGS. 1a and 1b, are given the same reference numbers. In contrast to the previously described embodiment, in the embodiment of FIG. 2 the angled section 22 of the gas generator carrier 16 does not extend obliquely, but rather at right-angles away from the generator carrier 16, and the end of the section 22 facing the gas generator 12 forms a support surface 28. The sealing element 24 is arranged so that a wave section 30 lies between the support surface 28 and the mounting flange 20 of the gas generator 12.

In the case of activation, the gas generator 12 and the wave section 30 are pressed by the pressure in the gas bag interior downwards and to the central axis A, respectively, so that the wave section 30 is compressed between the mounting flange 20 and the section surface 28 and forms a double-layered sealing section. The sealing effect and the stability of the sealing element 24 are thereby increased. The sealing element 24 can also be constructed and arranged so that a wave section 30 of the sealing element 24 is only pressed between the support surface 28 and the mounting flange 20 when the pressure builds up in the case of activation.

Figure 3:
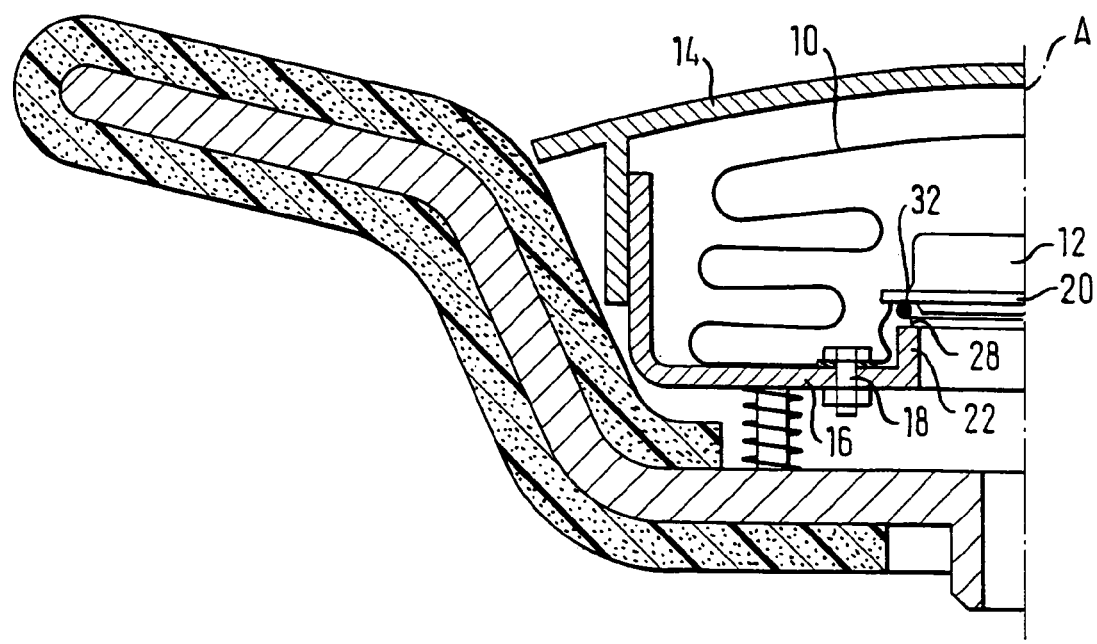
FIG. 3 shows a half-section of a gas bag module according to the invention in accordance with a third embodiment in the non-activated state.

The embodiment illustrated in FIG. 3 differs from the embodiment of FIG. 2 in that on the side of the mounting flange 20 lying opposite the support surface 28, a further sealing element 32 is arranged in the form of an encircling sealing ring, with which the mounting flange 20 of the gas generator 12 comes to lie directly on the support surface 28 in the case of activation, without a wave section of the sealing element 24 being pushed therebetween. The additional sealing element 32 provides for the primary sealing of the gas bag interior. In this embodiment, therefore, the sealing element 24 does not have to be constructed so as to be encircling. Rather, individual segments, fastened to the mounting flange 20 of the gas generator 12 and by means of screw connections 18 to the generator carrier 16, can also be provided for mounting the gas generator 12, when a sufficient sealing effect is ensured entirely by the sealing ring. The additional sealing element 32 can of course also be arranged on the section surface 28.

Figure 4:
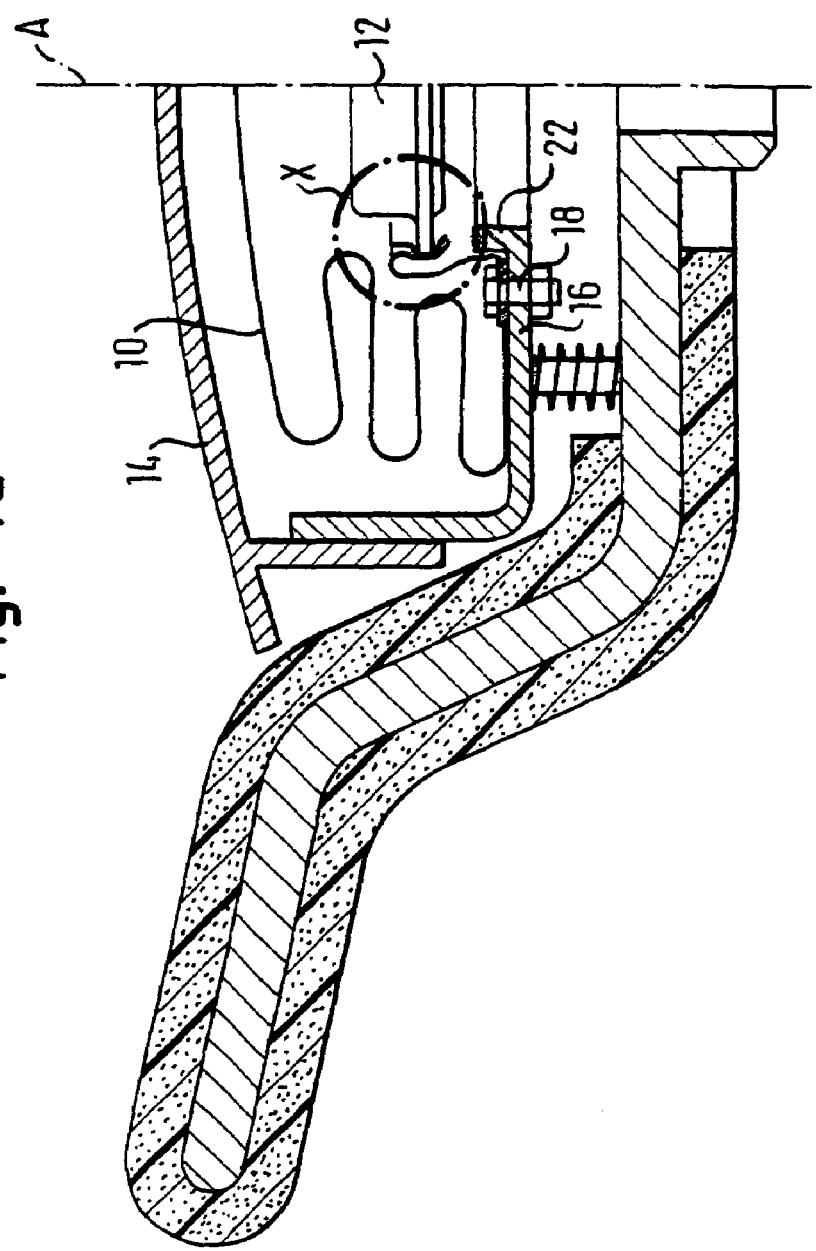

In the embodiment shown in FIG. 4a, the fastening of the upper edge portion of the sealing element 24 is realized by means of an intermediate element 34 arranged on the mounting flange 20, as can be seen more clearly from FIG. 4b. The sealing element 24 is arranged so that the edge portion, fastened to the combination element 34, is bent over once so that it lies against the combination element 34 with the side which is acted upon with pressure in the case of activation. Therefore, in the region of the mounting flange 20, a middle section 26 of the sealing element 24 is present, which in the case of activation is pressed by the pressure in the interior of the gas bag against the edge section which is fastened to the intermediate element 34, and thereby improves the sealing effect of the sealing element 24. The middle section 26 and the edge section of the sealing element 24, in so doing, rest against the intermediate element 34, which thereby provides for a relieving of the sealing element 24. Further, the gas generator 12 is moved downwards by the generated pressure, causing an end section 36 of the sealing element 24 to rest on a support surface 28 provided on the generator carrier 16. Thus, an encircling sealing is produced.

Figure 5:
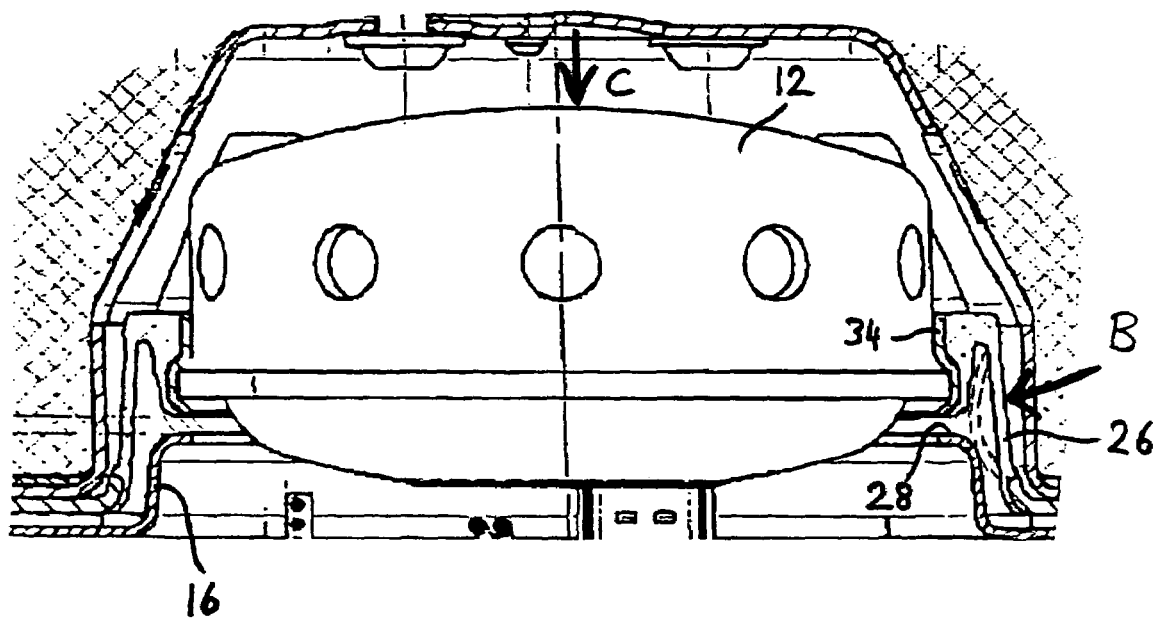
FIG. 5 shows part of a gas bag module according to the invention in accordance with a fifth embodiment in a partial sectional view.

The embodiment shown in FIG. 5 substantially corresponds to the above described embodiment, except for some minor differences in the design of particular components. From the Figure it is apparent that the pressure generated by the gas generator 12 in the case of activation acts both in lateral direction, as indicated by arrow B, and in the direction of arrow C. As indicated by the dashed lines, the lateral pressure causes the middle section 26 of the encircling sealing element 24 to abut both the bent over edge portion of the sealing element 24 and a surface portion of the generator carrier 16, on the one hand, while the gas generator 12, due to the pressure acting in the direction of arrow C, is moved downwards, causing the end section 36 of the sealing element 24 to rest on the support surface 28 of the generator carrier 16, on the other hand.

The various steps described with the aid of the individual embodiments for improving the sealing of the interior of the gas bag can of course also be combined with each other.

The invention claimed is:

1. A gas bag module for a motor vehicle steering wheel, the gas bag module comprising a gas bag, a gas generator mounted so as to be capable of swinging in order to amortize vibrations, a generator carrier, means for bracing the gas bag on the generator carrier, and an elastically deformable, in relation to a central axis of the gas bag module encircling sealing element, the sealing element being fastened by free edge portions of said sealing element directly or indirectly to the gas generator and to the generator carrier, respectively, in order to seal an interior of the gas bag from a space between the gas generator and the generator carrier before and on filling of the gas bag, a middle section of the sealing element, which is free before the filling of the gas bag, being deflected by the pressure occurring in the interior of the gas bag on filling of the gas bag, so that the middle section comes directly or indirectly in abutment with a support surface, the middle section of the sealing element being constructed in a wave-form and projecting between the gas generator and the support surface.

2. The gas bag module according to claim 1, wherein the gas generator is at least partially supported in the gas bag module by the sealing element.

3. The gas bag module according to claim 1, wherein in that the sealing element is constructed in the manner of a cylinder and has a wave-like contour in cross-section.

4. The gas bag module according to claim 1, wherein in that a free edge portion of the sealing element is fastened to a mounting flange of the gas generator.

5. The gas bag module according to claim 1, wherein in that the support surface is formed on a section of the generator carrier.

6. A gas bag module for a motor vehicle steering wheel, the gas bag module comprising a gas bag, a gas generator mounted so as to be capable of swinging, a generator carrier, means for bracing the gas bag on the generator carrier, and an elastically deformable, in relation to a central axis of the gas bag module encircling seating element, the sealing element being fastened by free edge portions of the sealing element directly or indirectly to the gas generator and to the generator carrier, respectively, a middle section of the sealing element, which is free before a filling of the gas bag, being deflected by the pressure occurring in an interior of the gas bag on filling of the gas bag, so that the middle section comes directly or indirectly in abutment with a support surface, wherein the support surface is formed on an intermediate element arranged on the gas generator.

7. A gas bag module for a motor vehicle steering wheel, the gas bag module comprising a gas bag, a gas generator mounted so as to be capable of swinging in order to amortize vibrations, a generator carrier and means for bracing the gas bag on the generator carrier, the gas generator being deflected by the pressure occurring in an interior of the gas bag on filling of the gas bag, so that the gas generator is pressed against a support surface formed on the generator carrier, a sealing element being provided between the gas generator and the support surface, the sealing element sealing the interior of the gas bag from a space between the gas generator and the generator carrier on filling of the gas bag.

8. The gas bag module according to claim 7, wherein the sealing element is fastened on one side of a mounting flange of the gas generator.

9. The gas bag module according to claim 7, wherein the sealing element is fastened on the support surface.

10. The gas bag module according to claim 7, wherein several segments of an elastically deformable material are provided, distributed over the periphery of the gas generator, which are fastened directly or indirectly to the gas generator and to the generator carrier and by which the gas generator is at least partially supported in the gas bag module.

11. A gas bag module for a motor vehicle steering wheel, the gas bag module comprising a gas bag, a gas generator mounted so as to be capable of swinging, a generator carrier and means for bracing the gas bag on the generator carrier, the gas generator being deflected by the pressure occurring in an interior of the gas bag on filling of the gas bag, so that the gas generator is pressed against a support surface formed on the generator carrier, a sealing element being provided between the gas generator and the support surface, wherein an encircling mounting flange of the gas generator is pressed onto the support surface.

12. A gas bag module for a motor vehicle steering wheel, the gas bag module comprising a gas bag, a gas generator mounted so as to be capable of swinging, a generator carrier and means for bracing the gas bag on the generator carrier, the gas generator being deflected by the pressure occurring in an interior of the gas bag on filling of the gas bag, so that the gas generator is pressed against a support surface formed on the generator carrier, a sealing element being provided between the gas generator and the support surface, wherein the sealing element is an encircling sealing element, formed as a sealing ring.

* * * * *